Sept. 6, 1955 R. J. GERTH 2,716,846
ROTARY KNIFE SHARPENER
Filed June 2, 1953
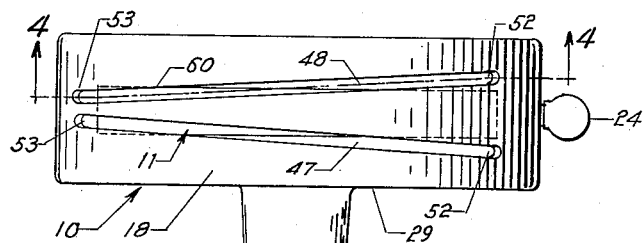
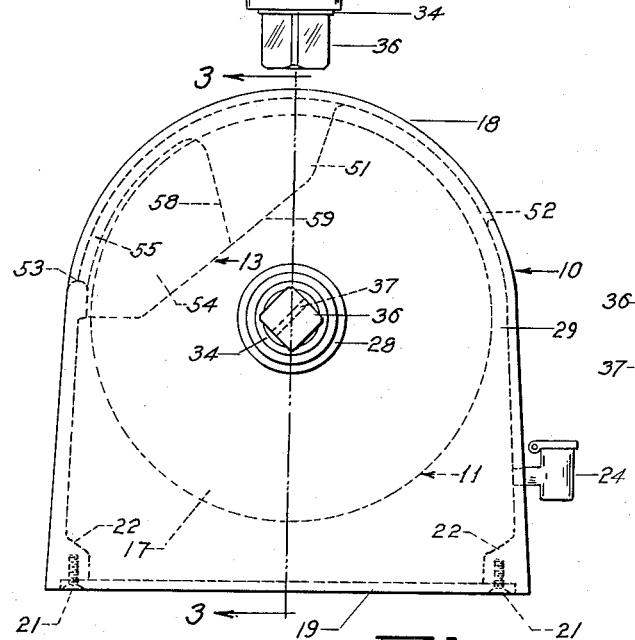
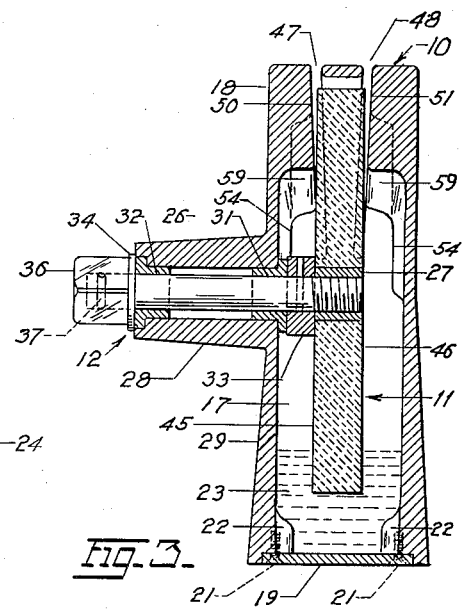
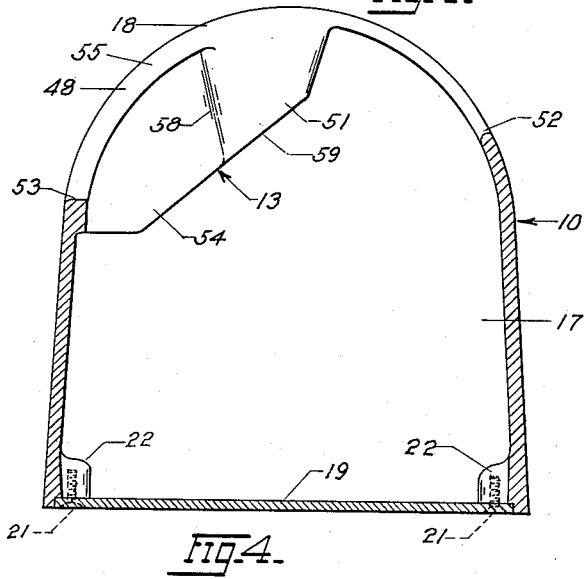
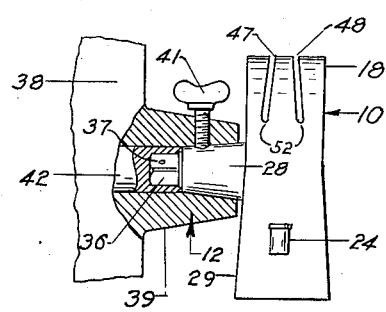
ROY J. GERTH
INVENTOR.
BY
ATTORNEYS.

2,716,846

ROTARY KNIFE SHARPENER

Roy J. Gerth, San Fernando, Calif.

Application June 2, 1953, Serial No. 359,109

5 Claims. (Cl. 51—128)

This invention relates to a rotary knife sharpener, and particularly to a knife sharpener adapted for use in sharpening relatively long butcher knives. The device is particularly designed for use in conjunction with a meat grinder in a butcher shop, means being provided to operatively associate the grinding wheel of the sharper with a motor driven component of the meat grinder.

In butcher shops and similar commercial establishments wherein meat is cut throughout the working day, considerable time is wasted in maintaining the relatively long butcher knives in a highly sharpened condition. The manual sharpening of such knives is a relatively laborious process requiring a substantial length of time and effort which accumulates to effect a marked reduction in the overall efficiency of the butcher or other meat cutter. Because of this loss of efficiency due to the necessity for frequent sharpening of knives, attempts have been made to provide automatic knife sharpening equipment adapted to achieve the desired result in a relatively short period of time. Such equipment, however, is deficient in several respects, one of which is that it requires a separate electric motor and is, accordingly, relatively expensive. Furthermore, conventional automatic knife sharpening equipment does not readily provide the sharp edge necessary for efficient meat cutting operations, particularly when the knife to be sharpened is of the long type customarily utilized in meat cutting establishments.

In view of the above factors characterizing the field of knife sharpening equipment, it is an object of the present invention to provide a highly simple, inexpensive and efficient knife sharpening device having uniquely related grinding surfaces and tables adapted to quickly provide a sharp knife edge on a blade of extreme length.

Another object of the invention is to provide a knife sharpener adapted to be associated with a meat grinder to effect automatic knife sharpening without the necessity of providing a separate sharpener motor.

These and other more specific objects will appear upon reading the following specification and claims, and upon considering in connection therewith the attached drawing to which they relate.

In the drawing:

Figure 1 is a side elevational view of a knife sharpener embodying the present invention;

Figure 2 is a top plan view of the showing of Figure 1;

Figure 3 is a vertical transverse section taken along line 3—3 of Figure 1 and as viewed in the direction of the arrows;

Figure 4 is a longitudinal vertical section along line 4—4 of Figure 2; and

Figure 5 is a detail view, partly in elevation and partly in section, illustrating the means for associating the sharpener with a driven component of a meat grinder.

Referring to the drawings, the knife sharpener may be seen to comprise a casing 10 adapted to enclose and rotatably support a grinding wheel 11, the wheel being of somewhat smaller diameter than the casing and disposed with its side faces parallel to the casing side walls. The invention further comprises drive means 12 associating the grinding wheel 11 with a driven component of a meat grinder, and slot and guide means 13 for accurately positioning a knife blade at an efficient sharpening angle relative to a grinding surface of the wheel.

Casing 10 is generally clock-shaped and comprises a one-piece casting having a semicylindrical upper portion which merges with a generally rectangular lower or reservoir portion. Except where modified to form the slot and guide means 13, the upper and lower portions of casing 10 define a grinding wheel and reservoir chamber 17 of corresponding clock-shape, the upper wall 18 of the chamber being semicylindrical as illustrated. The bottom of casing 10 is adapted to be opened to permit mounting and removal of the grinding wheel 11, there being a horizontal bottom plate 19 secured in position by screws 21 which extend into suitable lugs 22 formed integral with the casing. Bottom plate 19 is provided with sealing means, not shown, to prevent leakage of oil 23 from the lower or reservoir portion of the casing. This oil may be of any suitable type and is of sufficient depth, as shown in Figure 3, to extend above the lower grinding wheel edge and to approximately the level of the fill cup 24 shown in Figures 1 and 2.

The drive means 12 for grinding wheel 11 comprises a horizontal shaft 26 which is threaded into a bushing 27 in the grinding wheel and extends outwardly through a frusto-conical boss 28 formed integral with one side wall 29 of casing 10. Boss 28 is disposed axially of the upper casing portion, so that the grinding wheel 11 is concentric with, and with its periphery spaced inwardly from, the semicylindrical upper casing wall 18. To provide for the free rotation of shaft 26 and wheel 11, a pair of bushings 31 and 32 are mounted at the inner and outer shaft portions. The inner bushing 31 is formed with an inner flange which seats over the inner surface of wall 29 and bears against one side of a spacing collar 33 pinned on shaft 26, the other side of the collar bearing against grinding wheel 11.

Outer bushing 32 is similarly formed with a flange which seats in an annular groove at the outer end of boss 28 and bears at its outer surface against the inner surface of a washer 34, the outer washer surface being in engagement with a square drive block 36 secured on the shaft end by a pin 37. The described arrangement of washer 34, drive block 36, collar 33, etc., is such that wheel 11 is effectively maintained at the exact center of the casing.

In constructing the knife sharpener, shaft 26 is first assembled with drive block 36, washer 34 and motor bushing 32. It is then inserted through boss 28, after which inner bushing 31 and collar 33 are inserted through the bottom opening in the casing. After the inner bushing and collar are positioned over the inner shaft end, the grinding wheel 11 is inserted through the bottom opening and the shaft is turned to threadedly mount the wheel. As the final step, the pin for collar 33 is inserted and bottom plate 19 positioned by means of screws 21, the oil 23 then being fed through fill cup 24 and into the oil reservoir chamber.

Referring to Figure 5, the assembled sharpener is shown as mounted on a meat grinder or the like, a portion of which is indicated at 38. The illustrated meat grinder is formed with a relatively large boss 39 adapted to receive the knife sharpener boss 28, a thumb screw 41 being provided to lock the bosses together. In the arrangement illustrated, a driven shaft 42 of the meat grinder extends into boss 39 and is provided at its end with a rectangular recess which receives the drive block 36 on sharpener shaft 26. A driving connection is thus effected between meat grinder shaft 42 and grind wheel shaft 26 by merely inserting the sharpener boss 28 and drive block 36 respectively into meat grinder boss 39 and drive shaft 42, and then rotating the thumb screw 41 until the associated parts are locked in position.

According to the invention, the grinding wheel 11, which may be of emery or other suitable abrasive, is formed with inner and outer side faces 45 and 46 disposed in parallel planes which are perpendicular to the horizontal drive shaft 26. Side faces 45 and 46 cooperate with the slot and guide means 13, which comprise inner and outer slots 47 and 48 formed in the semicylindrical upper wall 18 of casing 10, and cooperating inner and outer grinding tables or surfaces 50 and 51 formed integral with the casing 10 above shaft 26. Slots 47 and 48 lie in perpendicular planes and converge laterally in such a way that their ends 52 (Figure 2) adjacent one end of wall 18 are spaced from each other a distance greater than the spacing between the parallel wheel faces 45 and 46, while their ends 53 at the other end of wall 18 are closely spaced a distance less than the spacing between the wheel faces. Referring to Figures 3 and 4, it will be noted that the widely spaced ends 52 of slots 47 and 48 are disposed substantially above the level of shaft 26, while the closely spaced slot ends 53 are at approximately the same level as the shaft. This relative location of the slot ends 52 and 53 is important in that it adapts the device for sharpening of very long blades, the blade portion adjacent the knife handle being at the end 53, and the tip of the blade extending a substantial distance past end 52.

The grinding tables or surfaces 51 and 52 are flush with the outer edges of slots 47 and 48 and are disposed in planes which converge laterally at the same angle and in the same direction as the slots. However, the grinding tables 50 and 51 do not lie in perpendicular planes but instead converge downwardly to provide for the proper guiding of the knife blade against a vertical grind wheel face 45 or 46. The angle of downward convergence is such that the planes of the grinding tables 50 and 51 intersect shaft 26 between the planes of grinding wheel faces 45 and 46, but intersect the upper casing portion outwardly of the planes of the grinding wheel faces.

In the specific description of the grinding tables 50 and 51 and associated components and surfaces, only the outer table 51 will be described since this table is symmetrical, about a plane midway between and parallel to grind wheel faces 45 and 46, with inner table 50. Referring to Figures 1, 3 and 4, the table 51 comprises a relatively thick portion of the outer vertical side wall of casing 10. An adjacent casing side wall portion, between the grinding table and slot end 53, is also thickened but is only approximately half as thick as the table itself, so that a recess 54 is formed. The recess 54 is defined at its upper portion by a relatively thick section 55 of upper casing wall 18, and at its inner portion by an upwardly extending side wall 58 of table 51. Both the table 51, and the thickened casing wall which defines recess 54, have a common lower edge or side 59 which drops off to the relatively thin main body of the casing wall, and slants upwardly and inwardly as illustrated. The thick section 55 of semicylindrical casing wall 18 is to be distinguished from its main body, which is relatively thin both to the right of table 51 as viewed in Figures 1 and 4, and between the full lengths of slots 47 and 48.

The locations of table wall 58, and of slant edge 59, are such that the corresponding grinding table portions will be closely adjacent, but barely out of contact with, the cooperating grinding surface of wheel 11. Section 55 of wall 18 is also adapted to be barely out of engagement with the grinding wheel periphery, which crosses beneath it as indicated at 60 in Figure 2. The outer side face 46 of grinding wheel 11 is thus closely adjacent the lower portion of cutting table 51, and in addition crosses beneath wall section 55, the recess 54 serving to prevent contact between the wheel and casing wall adjacent slot end 53. It follows that when a knife blade is positioned edge down in slot 48 a grinding action will occur either at crossover point 60, or at the lower portion of table 51, or both. Various portions of the periphery of wheel face 46 are thus utilized to provide an effective and efficient grinding action.

In the operation of the knife sharpener, the drive block 36 is inserted into shaft 42 of the meat grinder 38, and the thumb screw 41 is tightened to form a driving connection between the meat grinder motor and the grinding wheel 11 of the sharpener. The relation of these parts is such that the grind wheel 11 rotates clockwise as viewed in Figure 1. A long butcher knife is then positioned in the slot 48 in such a way that its handle is adjacent slot end 53. The thick portion 55 of wall 18, and the lower part of grinding table 51, operate to guide the blade edge at the proper angle and into grinding contact with wheel surface 46. The knife blade portions adjacent table 51 and wall section 55 are then quickly ground to a sharp edge, after which the knife is drawn slowly through slot 48. Successive portions of the blade, and finally its tip, are thus engaged with grinding wheel 11 and are accordingly sharpened. After one side of the knife blade is thus ground, the blade is lifted out of slot 48 and positioned in the slot 47 for grinding of the other blade side in the identical manner. Both sides of the knife blade are thus ground, in a relatively short space of time, to the sharp edge required for efficient meat cutting. As the blade is ground, the wheel 11 is constantly bathed in the oil 23 disposed in the lower portion of casing 10, the oil being carried up by the wheel and into engagement with the knife blade to enhance and facilitate the operation.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a knife sharpener, a casing having a generally semicylindrical upper wall, a horizontal shaft journaled in said casing substantially axially of said upper wall, a grinding wheel mounted in said casing and axially on said shaft for rotation thereby, said wheel having outer and inner side faces the peripheries of which are inwardly adjacent said upper wall and lie in parallel planes perpendicular to said shaft, outer and inner slots formed in the major portion of said upper wall and lying in substantially vertical planes transverse to said shaft, said vertical planes converging in such a way that adjacent slot ends are respectively more widely spaced and more closely spaced than the spacing between said parallel planes so that said slots each cross over said peripheries of said side faces, and outer and inner grinding tables respectively provided within said casing and adjacent said slots to guide a knife blade into grinding relationship with said peripheries of said side faces.

2. The invention as claimed in claim 1, wherein each of said grinding tables is integral with the adjacent side wall of said casing, is substantially flush with the outer wall of the associated slot, and lies in a plane which inclines from said outer slot wall to intersect said shaft between said parallel planes containing said peripheries of said grinding wheel side faces.

3. The invention as claimed in claim 2, wherein each of said grinding tables is disposed generally above said shaft intermediate opposite ends of the associated slot.

4. A rotary knife sharpener, comprising an integral casing having an open bottom, generally parallel side walls, and a semicylindrical upper wall, a shaft journaled in one of said side walls substantially axially of said upper wall, a grinding wheel mounted in said casing and axially on said shaft for rotation thereby, said wheel having outer and inner side faces the peripheral portions of which are spaced inwardly from said upper casing wall and lie in parallel planes perpendicular to said shaft, a removable bottom plate mounted over the open bottom of said casing and adapted to seal the same against leakage of oil, means to fill said casing with oil to a level above the lower portion of said grinding wheel, outer and inner slots formed in the major portion of said upper casing wall and lying in substantially vertical planes transverse to said shaft, said vertical planes converging laterally in such a way that adjacent slot ends are respectively more widely spaced and more closely spaced than the spacing between said parallel planes, and outer and inner grinding tables respectively provided adjacent said slots to guide a knife blade into grinding relationship with said peripheral portions of said grinding wheel side faces, said grinding tables converging downwardly toward said shaft to maintain said knife blade at the desired grinding angle.

5. The invention as claimed in claim 4, wherein said shaft is journaled in a frusto-conical boss formed integral with said one casing side wall and tapering outwardly therefrom, and a drive block is fixedly mounted on the outer end of said shaft adjacent the end of said boss, said boss and drive block being adapted, respectively for mounting in a boss in a meat grinder and in a corresponding recess in the end of a driven shaft of said meat grinder, whereby a driving connection is effected with said meat grinder for rotation of said grinding wheel.

References Cited in the file of this patent

UNITED STATES PATENTS

| | | |
|---|---|---|
| 822,070 | McLeran | May 29, 1906 |
| 1,255,104 | Mitchell | Jan. 29, 1918 |
| 1,286,948 | Crocker | Dec. 10, 1918 |
| 2,006,510 | Oxenhandler | July 2, 1935 |
| 2,257,407 | Wulff | Sept. 30, 1941 |